A. LEWINSKI.
PEANUT BLANCHING ROLLER AND METHOD.
APPLICATION FILED JULY 20, 1920.
1,427,000. Patented Aug. 22, 1922.
2 SHEETS—SHEET 1.
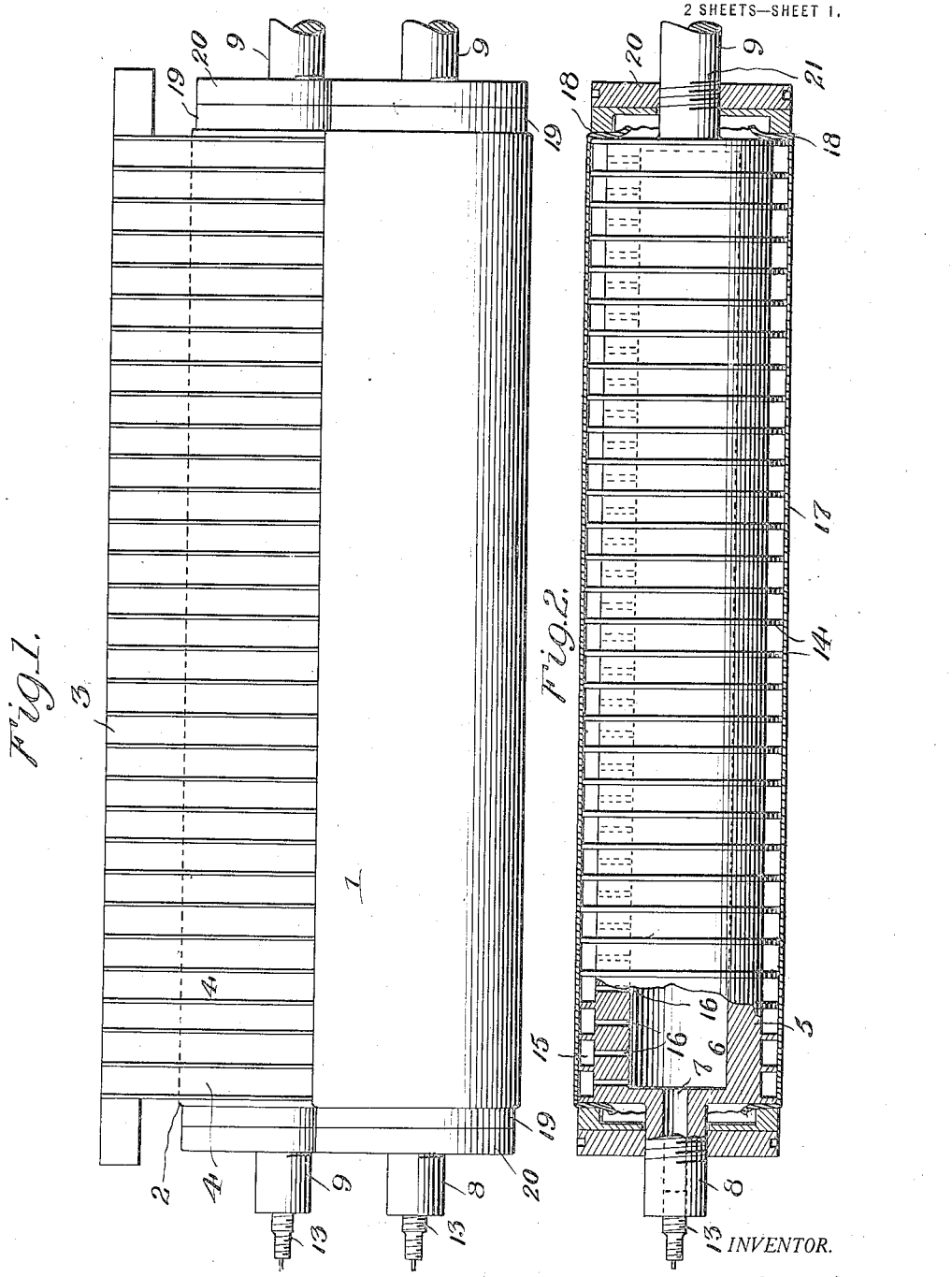
INVENTOR.
A. Lewinski
BY
Victor J. Evans
ATTORNEY.

A. LEWINSKI.
PEANUT BLANCHING ROLLER AND METHOD.
APPLICATION FILED JULY 20, 1920.
1,427,000.
Patented Aug. 22, 1922.
2 SHEETS—SHEET 2.
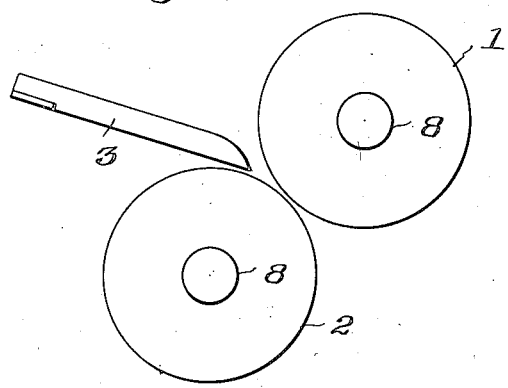
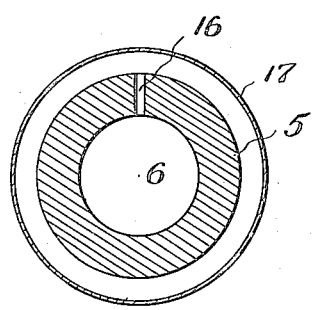
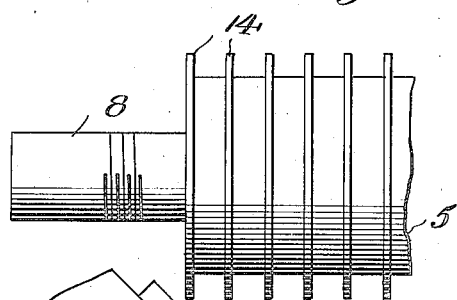
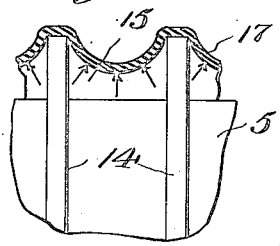
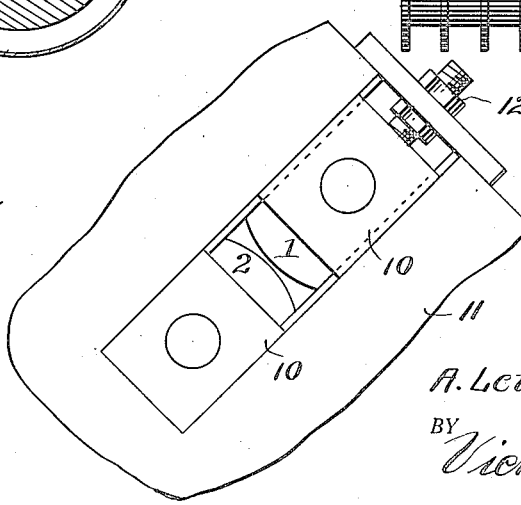
INVENTOR.
A. Lewinski
BY
Victor J. Evans
ATTORNEY.

UNITED STATES PATENT OFFICE.

ALEXANDER LEWINSKI, OF CHICAGO, ILLINOIS, ASSIGNOR OF ONE-TENTH TO WILLIAM R. SMITH, OF CHICAGO, ILLINOIS.

PEANUT-BLANCHING ROLLER AND METHOD.

1,427,000.

Specification of Letters Patent.   Patented Aug. 22, 1922.

Application filed July 20, 1920. Serial No. 397,586.

*To all whom it may concern:*

Be it known that I, ALEXANDER LEWINSKI, a citizen of the United States, residing at Chicago, in the county of Cook and State of Illinois, have invented new and useful Improvements in Peanut-Blanching Rollers and Methods, of which the following is a specification.

This invention relates to a peanut blanching machine and has for its primary object the construction of a machine that will blanch peanuts in a more efficient manner and in a more economical manner to the extent that only a relatively small amount of peanuts will be broken during the blanching operation.

An object of the invention is the construction of a blanching roller having yieldable characteristics of a nature that the peanuts will be individually gripped and subjected to a rubbing action in such a manner that the peanuts will be held against breaking, to a great extent.

Another object of the invention is the construction of a machine having a greater output than similar machines now on the market with the additional advantage that a much larger percentage of peanuts is not broken.

Besides the above my invention is distinguished in the particular construction of the rollers so that each peanut will be subject to a yieldable rubbing action that may be accurately controlled to produce the best results.

A feature of my invention is the underlying air spaces so that the action of the blanching roller upon the peanut will be perfect, and besides prevent the peanut from being subject to too great a pressure which is a disadvantage of solid rubber rollers heretofore experimented with.

With these and other objects in view the invention will be better understood from the following detailed description taken in connection with the accompanying drawing wherein:

Fig. 1 is a plan view of the rollers associated with the distributor.

Fig. 2 is a longitudinal sectional view through one of the rollers.

Fig. 3 is a diagrammatic view showing the relation of the rollers to the distributor.

Fig. 4 is a cross sectional view of the rollers.

Fig. 5 is a detailed view of one end of the cylinder.

Fig. 6 is a detailed view illustrating how the distance between the rollers may be adjusted.

Fig. 7 is a diagrammatic view illustrating how the covering yields in the passage of a peanut.

Again referring to the drawing illustrating one of the many forms in which my invention may be constructed the numeral 1 designates the upper roller and the numeral 2 designates the lower roller, which are identical in construction as clearly shown in Fig. 2. In any well known manner these rollers are driven at unequal speed so that the rubbing action will be created in the passage of the peanuts between the rollers by the distributor 3. It will be noted that the distributor is constructed to provide a plurality of slots 4 to receive the peanuts from a suitably placed hopper and feed the peanuts in individual rows to the rollers so that each peanut, in a manner hereinafter described, will be individually gripped and subjected to a rubbing action so as to positively remove the skin therefrom while at the same time supporting the peanuts in the best manner possible to prevent cracking or breaking thereof.

Each roller consists of a cylinder 5 formed with an air chamber 6 that communicates with an air passage 7 passing through one of its stub shafts 8, the other stub shaft thereof is connected, in any suitable manner, to drive mechanism. In practice the stub shafts are mounted in journal boxes 10 in frame 11 of the machine so that in the adjustment of one of the boxes by the adjusting device 12 the distance between the rollers may be increased or decreased to regulate the action of the rollers on the peanuts. The air chamber 7 is normally closed by the air valve 13, which may be connected to a source of air pressure or may be operated by an ordinary air pump. Arranged upon the periphery of the cylinder are spaced annular ribs 14 which may be of any number and co-operating with a covering hereinafter described, to form individual air grooves 15 that communicate with the air chamber by the air ports 16. The covering 17 is of a yieldable air-proof nature and is stretched over the ribs as clearly shown in Fig. 2, with its end portions 18 clamped by the clamping ring 19 that is held in place by the locking plate 20 that has screw threaded engagement 21 with the stub shafts. In practice I have found it of great advantage to construct the covering of rubber so that the frictional engagement of the covering with the peanuts is greatly increased and besides stretching of the covering is properly accomplished.

From the foregoing description taken in connection with the accompanying drawing it will be apparent that when the peanuts are fed by the distributor in separate rows between the rollers the peanuts will be individually gripped by the yieldable action of the covering and this yieldable rubbing action is increased or decreased at will by regulating the air pressure in the air chamber and, to a certain extent, by adjusting the journal boxes.

A feature of my invention is the fact that by accommodating the stretching of the covering at spaced points the maximum amount of surface of each peanut is engaged in a manner that the removing of the skin is not interfered with but the entire surface of the peanuts is subject to a uniform pressure so as to hold the same against splitting or breaking. This is a very important feature of my invention and I wish it to be understood that the construction of the parts for accomplishing this action may be changed in various manners then illustrated in the drawings.

With the use of a roller as heretofore described the peanuts are subject to a relative uniform squeezing action irrespective of their various sizes which is absolutely necessary to prevent splits, and one of the greatest disadvantages of the solid rubber roller heretofore experimented with is the fact that different size peanuts blanch by different degrees of pressure between the rollers against the peanuts which splits the same. It will also be noted in my invention that first the outer surface of the roller is substantially smooth. The ends of the peanuts as well as the sides will become embedded in the covering so that the maximum amount of skin of the peanuts will be subject to a wiping action thereby accomplishing a "clean" product.

It will also be seen that by regulating the air pressure the yieldable action of the covering is changed so that a pressure may be obtained that will give the most efficient results and a cover retained in its most efficient shape.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A method of blanching peanuts which consists in subjecting the peanuts to a mechanical rubbing action under pneumatic pressure at, below or above atmospheric pressure.

2. A method of blanching peanuts which consists in subjecting the peanuts to a mechanical, yieldable rubbing action controlled by a confined fluid pressure.

3. A method of blanching peanuts which consists in subjecting the peanuts to a yieldable, rubbing, gripping action and regulating the effect of said action by the controllable pressure of a fluid.

4. A method of blanching peanuts consisting in subjecting each peanut individually to yieldable pneumatic pressures at right angles and lengthwise of the peanuts.

5. Peanut blanching rollers rotated at different speeds each roller being hollow and constructed to individually subject each peanut to a rubbing action pneumatically controlled.

6. Peanut blanching rollers each having a yieldable peripheral surface, and means for regulating the yieldability of said surface by action of air pressure.

7. Blanching rollers associated and driven at unequal speeds, each roller having a yieldable peripheral portion, and means for subjecting said peripheral portion to a changeable pressure.

8. Blanching rollers rotating in relation to each other, means for passing peanuts to the rollers, each of the rollers having a yieldable peripheral portion subject to an air pressure.

9. Blanching rollers rotating at different speeds relative to each other, a device for passing peanuts between the rollers, each roller being constructed to subject the peanuts individually to a yieldable, rubbing action, pneumatically controlled.

10. A blanching roller having a yieldable covering, and means for subjecting the interior of the covering to a controllable fluid pressure.

11. A blanching roller, a covering supported by the roller in a manner that spaced portions of the latter may yieldably give, and means for regulating the yieldable movement of the covering.

12. A blanching roller consisting of a hollow cylinder for receiving air under pressure therein, and a yieldable covering for the cylinder supported so that spaced portions may yieldably stretch to individually subject the peanuts to a rubbing action, there being communication between the air pressure and said spaced portions to regulate the stretching of the latter.

13. A blanching roller comprising a hollow cylinder, means for passing air, under pressure, to the cylinder, spaced annular ribs on the periphery of the cylinder, a yieldable covering supported by said ribs, said covering being subject to the air pressure within said cylinder.

14. A blanching roller consisting of a cylinder having an air chamber therein, means for confining air, under pressure, within the chamber, annular ribs spaced along the cylinder to form annular air grooves that are in communication with the air chamber, and an airproof, yieldable covering supported by the ribs making said grooves leak proof.

15. A blanching roller consisting of a cylinder having an air chamber therein, means for confining air, under pressure, within the chamber, annular ribs spaced along the cylinder to form annular air grooves that are in communication with the air chamber, and an air proof, yieldable covering supported by the ribs making said grooves leak proof, and means for clamping the covering in place.

16. A blanching roller of hollow formation having a yieldable peripheral surface acted upon by the air in the space within the roller.

17. A blanching roller of hollow formation having a yieldable perimeter, and means for increasing and decreasing the pressure of a fluid within the roller.

18. A blanching roller comprising a yieldable tubular blanching member and means for supporting the member and subjecting the material thereto to an action of a fluid.

19. A roller comprising a cylinder provided with spaced independent annular ribs, and a tubular covering slipped over said ribs.

20. A blanching roller comprising a cylinder, and a flexible tubular covering slipped over said cylinder, and having independently arranged air spaces between the covering and cylinder.

21. A blanching roller having a nonyieldable core provided with spaced annular independent ribs, and a flexible covering stretched over said ribs.

22. A blanching roller having a hollow cylindrical core provided on its periphery with spaced annular ribs, and a yieldable covering enclosing said ribs.

23. A blanching roller comprising a cylindrical core, annular ribs formed on the periphery of said core and spaced equal distances from each other longitudinally of the core, and a covering supported at spaced points by the ribs.

24. A pair of blanching rollers each consisting of a cylindrical core having annular ribs spaced longitudinally along its periphery, and a flexible covering enclosing said ribs, the ribs of one roller being in alignment with the ribs of the other roller.

25. A pair of blanching rollers having yieldable surfaces and air spaces underlying said surfaces, the spaces of one roller being in alignment at all times with the spaces of the other roller to accommodate movement of the surfaces of the rollers in the passage of the peanuts there between.

26. A pair of blanching rollers each having yieldable independent circular portions, and nonyieldable independent circular portions alternating therewith, the yieldable and nonyieldable portions of one roller being in alignment with the yieldable and nonyieldable portions of the other roller at all times.

27. A means for removing the inner skin of a nut which adheres to the kernel, said means comprising a traveling surface on which the nuts are deposited in cooperation with a grooved roller covered with a sheathing of flexible resilient material.

28. In a blanching machine, a roller having its peripheral surface provided with axially spaced independent annular grooves, and a covering for the grooves.

In testimony whereof I affix my signature.

ALEXANDER LEWINSKI.